(12) United States Patent
Muller

(10) Patent No.: US 7,486,959 B2
(45) Date of Patent: Feb. 3, 2009

(54) METHOD OF AND APPARATUSES FOR CELL SELECTION IN A MOBILE COMMUNICATIONS SYSTEM

(75) Inventor: Walter Muller, Upplands-Vasby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 308 days.

(21) Appl. No.: 10/547,891

(22) PCT Filed: Mar. 2, 2004

(86) PCT No.: PCT/SE2004/000285

§ 371 (c)(1),
(2), (4) Date: Sep. 1, 2005

(87) PCT Pub. No.: WO2004/080104

PCT Pub. Date: Sep. 16, 2004

(65) Prior Publication Data

US 2006/0178158 A1  Aug. 10, 2006

(30) Foreign Application Priority Data

Mar. 4, 2003  (SE) .................................. 0300582

(51) Int. Cl.
*H04Q 7/20* (2006.01)
*H04B 7/00* (2006.01)
*H04B 1/18* (2006.01)

(52) U.S. Cl. .................. 455/515; 455/436; 455/453
(58) Field of Classification Search .......... 455/436, 455/439, 442, 443, 444, 515, 412, 453
See application file for complete search history.

(56) References Cited

U.S. PATENT DOCUMENTS

| | | | | |
|---|---|---|---|---|
| 5,539,748 | A | * | 7/1996 | Raith ........................ 370/329 |
| 7,110,765 | B2 | * | 9/2006 | Amerga et al. ............ 455/436 |
| 2002/0032032 | A1 | * | 3/2002 | Haumont et al. .......... 455/436 |
| 2004/0043769 | A1 | * | 3/2004 | Amerga et al. ............ 455/437 |
| 2004/0043798 | A1 | * | 3/2004 | Amerga et al. ............ 455/437 |

FOREIGN PATENT DOCUMENTS

WO  WO 0027158 A1  5/2000
WO  WO 0105182 A1  1/2001

OTHER PUBLICATIONS

Swedish Patent Office, International Search Report for PCT/SE2004/000285, dated May 25, 2004.

* cited by examiner

*Primary Examiner*—Tilahun B Gesesse
(74) *Attorney, Agent, or Firm*—Roger S. Burleigh

(57) ABSTRACT

A method for cell selection at access in a cellular radio communication system. A first hysteresis level for determining a first ranking level of serving cell is used at access, and a second hysteresis level for determining a second ranking level of the serving cell is used in idle mode.

28 Claims, 3 Drawing Sheets

METHOD OF AND APPARATUSES FOR CELL SELECTION IN A MOBILE COMMUNICATIONS SYSTEM

TECHNICAL FIELD OF THE INVENTION

The present invention relates to transmissions and management of transmission power and channel resources in a communications system. Especially, it relates to cell selection in a cellular mobile radio system, particularly a Universal Mobile Telecommunications System, UMTS, or WCDMA system.

BACKGROUND AND DESCRIPTION OF RELATED ART

In many radio communications systems, such as UMTS, mobile stations and user equipment are paged when there is an incoming call. Paging is commonly initiated from a controlling element of a radio access network, such as a radio network controller, RNC. Upon reception of a paging message, a User Equipment in idle mode enters connected mode to be able to respond to the page. When in idle mode, the User Equipment commonly communicates on a common channel. Also when in connected mode, when in some states such as URA_PCT, CELL_PCH or CELL_FACH, communications are commonly undertaken on common channels.

Within this patent application, a radio network controller, RNC, is understood as a network element including an RRM (Radio Resource Management) entity. The RNC is connected to a fixed network. Node B is a logical node responsible for radio transmission/reception in one or more cells to/from a User Equipment. A base station, BS, is a physical entity representing Node B.

With reference to FIG. 1, base stations <<BS 1>> and <<BS 2>> are physical entities representing Nodes B<<Node B 1>> and <<Node B 2>> respectively. <<Node B 1>> and <<Node B 2>> terminate the air interface, called Uu interface within UMTS, between UE and respective Node B towards the radio network controller <<RNC>>. <<RNC>> is connected to a fixed network <<Network>>.

In FIG. 1, the base stations are connected to the same radio network controller RNC. However, this specification also covers the exemplary situation where the base stations are connected to different RNCs. In UMTS, the RLC protocol is terminated in a serving RNC, SRNC, responsible for interconnecting the radio access network of UMTS to a core network <<Network>>.

$3^{rd}$ Generation Partnership Project (3GPP): *Technical Specification Group Radio Access Network, Radio Link Control (RLC) protocol specification*, 3GPP TS 25.304 v3.9.0, France, December 2001, describes UE procedures in idle mode and procedures for cell reselection in connected mode. Section 5.2 describes cell selection and reselection in idle mode. Subsections 5.2.6.1.4 and 5.2.6.1.5 specify cell reselection criteria and cell reselection parameters.

$3^{rd}$ Generation Partnership Project (3GPP): *Technical Specification Group Radio Access Network, Radio Link Control (RLC) protocol specification*, 3GPP TS 25.331 v3.9.0, France, December 2001, specifies radio resource control, RRC, protocol. Section 8.1.2 describes paging and section 8.3.1 describes cell and UTRAN registration area, URA, update procedures. Section 8.5.6 describes radio link failure criteria and actions upon radio link failure. Section 10.2.20 describes Paging Type 1, using PCCH (Paging Control Channel), and Paging Type 2, using DCCH (Dedicated Control Channel), messages for paging. Section 10.3.3.47 briefly describes U-RNTI (UTRAN Radio Network Temporary Identity) being allocated to a UE having an RRC connection and identifying the UE within UTRAN.

None of the cited documents above discloses a method and system for cell selection when entering connected mode from idle mode eliminating or reducing the risk of excessive transmission power and time for call setup.

SUMMARY OF THE INVENTION

When communicating on a common channel, existing specifications do not support fast power control or macro diversity. Fast power control and macro diversity are known to be efficient methods of managing transmission power and channel resources. Consequently, when communicating on a common channel there is a problem of using transmission power not greater than necessary, when excessive transmission power can be due to non-optimum cell selection or frequent cell (re-)selections. Frequent cell (re-)selections introduce additional signaling and associated power consumption. Additionally signaling loads the system and additional power consumption drains batteries. Existing technical specifications suggest hystereses or offsets regarding channel quality and time limit, prior to which cell (re-)selection is not allowed, to limit cell (re-)selection frequency.

However, existing hystereses, offsets or time limits would increase call setup time, if cell (re-)selection were undertaken at call setup. Maximum call setup time is limited in telecommunications regulations and should generally be small.

Thus, there is a need for cell (re-)selection at call setup, e.g. upon reception of a paging message, free of delay associated with hystereses, offsets and time limits. It is observed that using a second or third best cell in terms of transmission power/received signal quality in place of the best cell does not degrade performance in idle mode as much as in connected mode.

Consequently, it is an object of this invention to provide a method and system of mode dependent resource management.

Further, it is an object to reduce signaling and power consumption in idle mode without increasing time to respond or for system access.

It is also an object to reduce delay of cell (re-)selection when changing from idle mode to connected mode.

Another object is to reduce transmission power level during call setup.

A further object is to reevaluate cell selection upon system access.

A still further object is to allow access messages also in cells where UE has not registered prior to access.

These objects are met by the invention, which is particularly well suited for a Universal Mobile Telecommunications System, UMTS, reevaluating cell selection prior to user equipment transmitting access messages to radio access network.

Preferred embodiments of the invention, by way of examples, are described with reference to the accompanying drawings below.

DESCRIPTION OF PREFERRED EMBODIMENTS

Figure 1:
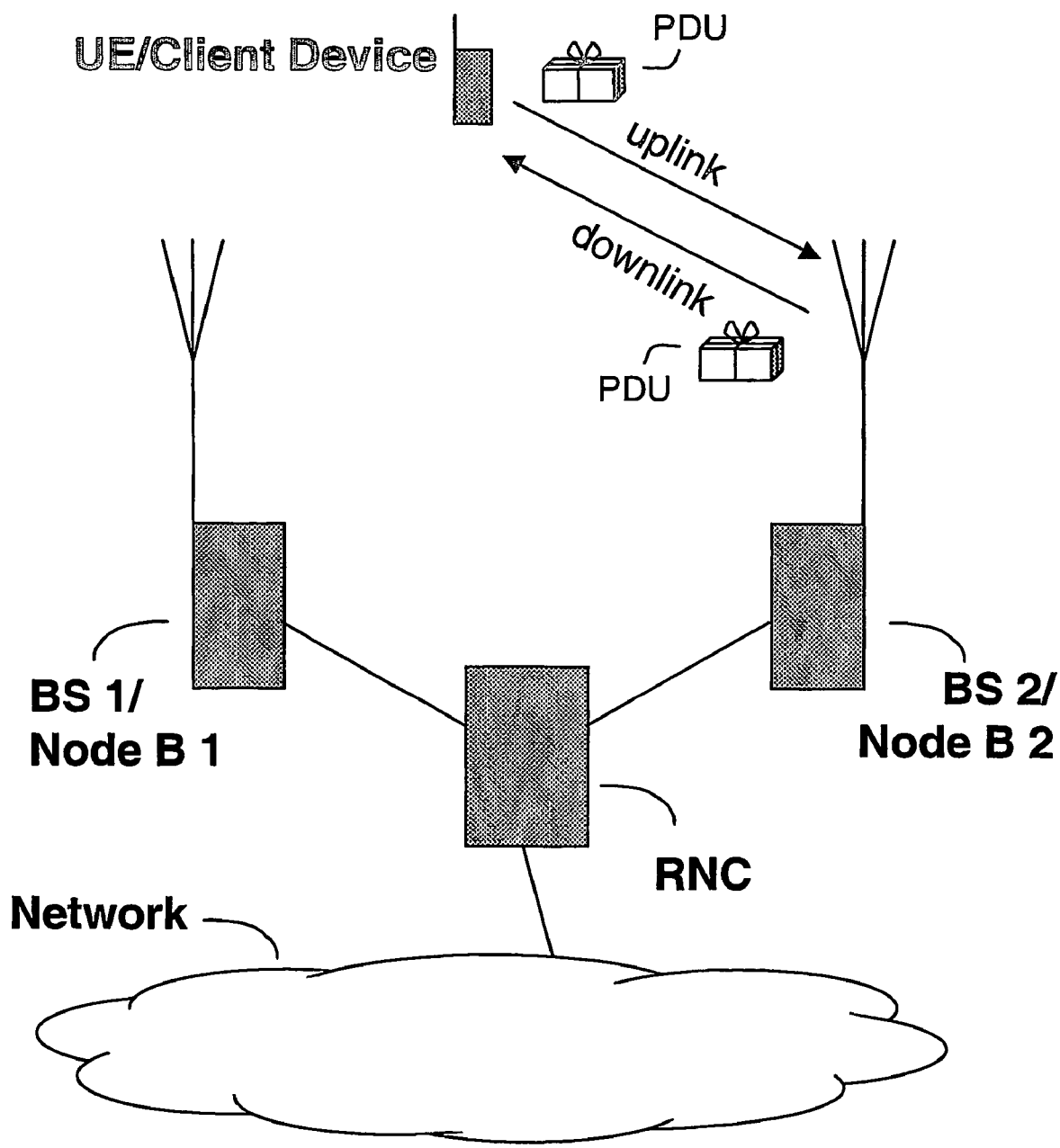
FIG. 1 shows communication between a UE and a base station involved in a connection between an RNC and the UE of a cellular radio communications system.

With reference to FIG. 1, paging messages and other messages are transmitted over the radio interface between <<UE/Client Device>> and <<BS 2/Node B 2>>. Paging messages are transmitted in downlink direction. In uplink direction <<BS 2/Node B 2>> represents the receiver side of the radio interface and in downlink direction receiver side is represented by <<UE/Client Device>> and <<BS 2/Node B 2>> is on the transmitter side. Paging is commonly initiated from a controlling element of a radio access network, such as a radio network controller <<RNC>>.

Figure 2:
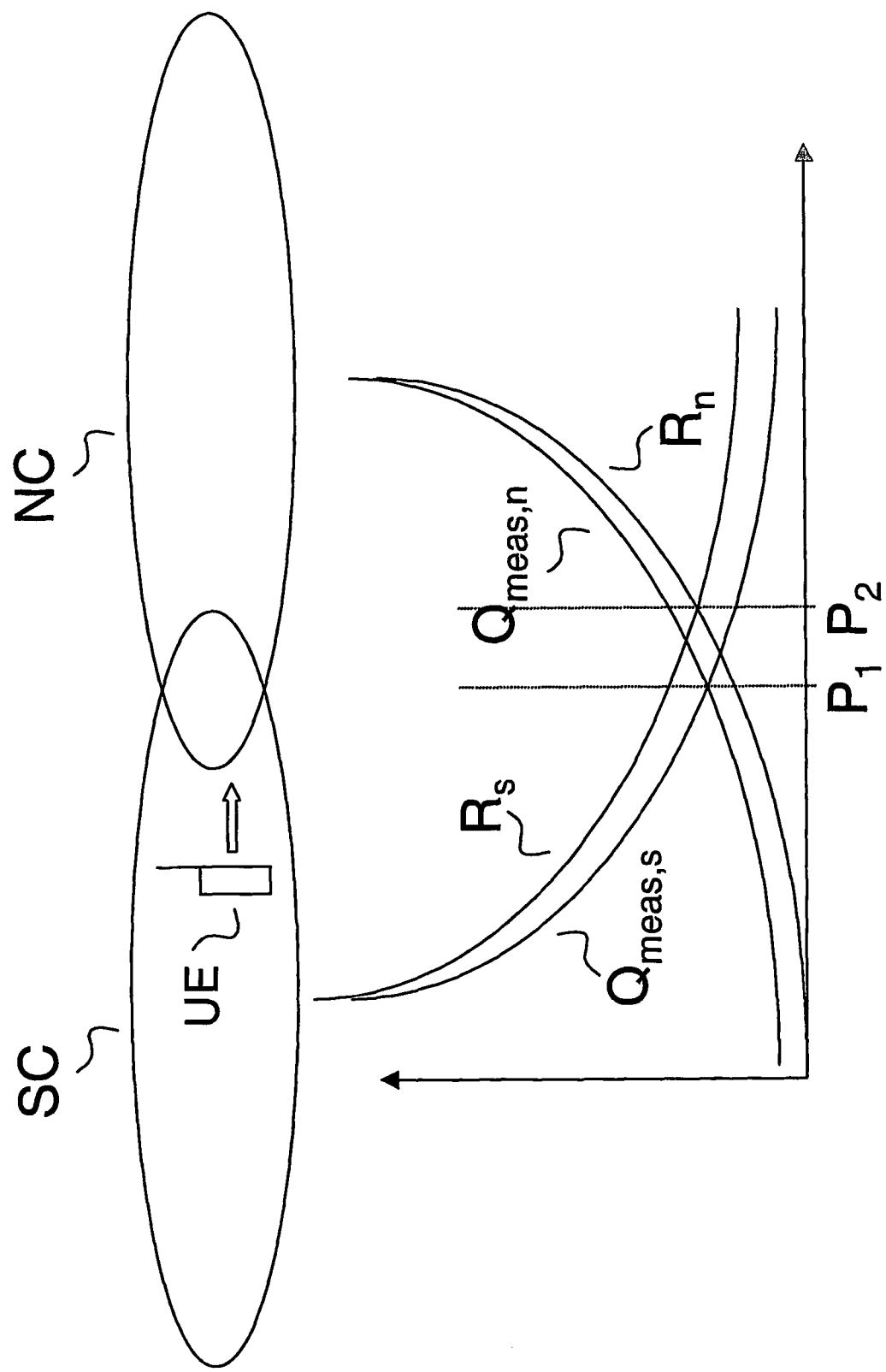
FIG. 2 schematically illustrates cell ranking.

FIG. 2 schematically illustrates cell ranking. A User Equipment <<UE>> is moving from the left to the right and is currently served by a serving cell <<SC>>. As the User Equipment moves towards a neighboring cell <<NC>> the measured quality <<$Q_{meas,s}$>> in the serving cell deteriorates and the measured quality <<$Q_{meas,n}$>> of signals of a neighboring cell ameliorates. At a boundary distance <<$P_1$>> the measured quality of the serving cell equals the measured quality of signals of a neighboring cell. As regards perceived quality this first boundary <<$P_1$>> would be an optimal boundary for cell reselection. However, if the User Equipment moves back and forth around this boundary <<$P_1$>>, there would be a great number of cell reselections and associated signaling and transmissions. This would load the system and reduce capacity available for payload and other signaling needs.

The associated transmissions also entail power consumption. The risk of changing cells back and forth a multitude of times is known in the art to be reduced by introduction of hysteresis and offset as illustrated in FIG. 2, by ranking levels <<$R_s$>>, <<$R_n$>>. The ranking level of the serving cell <<$R_s$>> is obtained by adding a fixed hysteresis level of the serving cell to the measured quality <<$Q_{meas,s}$>>. Correspondingly, ranking of the neighboring cell <<$R_n$>> is achieved by reducing the measured quality <<$Q_{meas,n}$>> by a time independent offset and an offset or penalty dependent on time elapsed since the latest cell (re-)selection. Comparing rankings, cell (re-)selection will take place at boundary <$P_2$>> where ranking of serving cell <<$R_s$>> equals ranking of neighboring cell <<$R_n$>>. As should be evident from the figure, there is a cost for the introduction of hystereses and offsets. The measured quality <<$Q_{meas,s}$>> of being served by the serving cell <<SC>> is inferior to the quality <<$Q_{meas,n}$>> of being connected to the neighboring cell <<NC>> due to the deferred cell (re-)selection in the region between the boundaries <<$P_1$>> and <<$P_2$>>. The benefit achieved is that after a cell re-selection User Equipment <<UE>> is less likely to reselect the originally serving cell at minor movements in the reverse direction as the roles of serving cell and neighboring cell will be changed at cell (re-)selection. The boundary for cell (re-)selection will be further away from the User Equipment <<UE>> than boundary <<$P_1$>>.

The cost of reduced quality due to the deferred cell (re-)selection is paid by respective compensatory increased transmission power of serving cell Node B and User Equipment transmission power control. In idle mode the transmission power increase is affordable. However, in connected or active mode the relative amount of transmissions increase and the transmission power increase becomes costly and could, e.g., drain batteries of battery powered equipment.

According to the invention, cell (re-selection) based on ranking including hysteresis or offset as described in relation to FIG. 2 is adopted in idle mode but not in connected or active mode. In alternative embodiment they are used to a much smaller extent in connected or active mode than in idle mode. This is achieved by using different hysteresis and offset levels for the different modes.

If the same hysteresis and offset levels were used in both idle and connected/active mode, their setting would require regard of operation in both idle and connected mode for a compromise to be determined. Using a particular hysteresis or offset level in idle mode, not used in connected or active mode, does not require such compromising. Consequently, hysteresis and offset levels can be optimized for minimum signaling load and transmissions and related power consumption in idle mode and connected/active modes separately.

In order to keep transmission power and time to respond small, the first embodiment suggests usage of no hysteresis and offset at call setup, e.g. in response to a paging message. As there is no offsetting there is no time penalty for cell (re-)selection either.

According to a second embodiment hysteresis or offset may be used also in connected or active mode, but at a much smaller extent than in idle mode.

Figure 3:
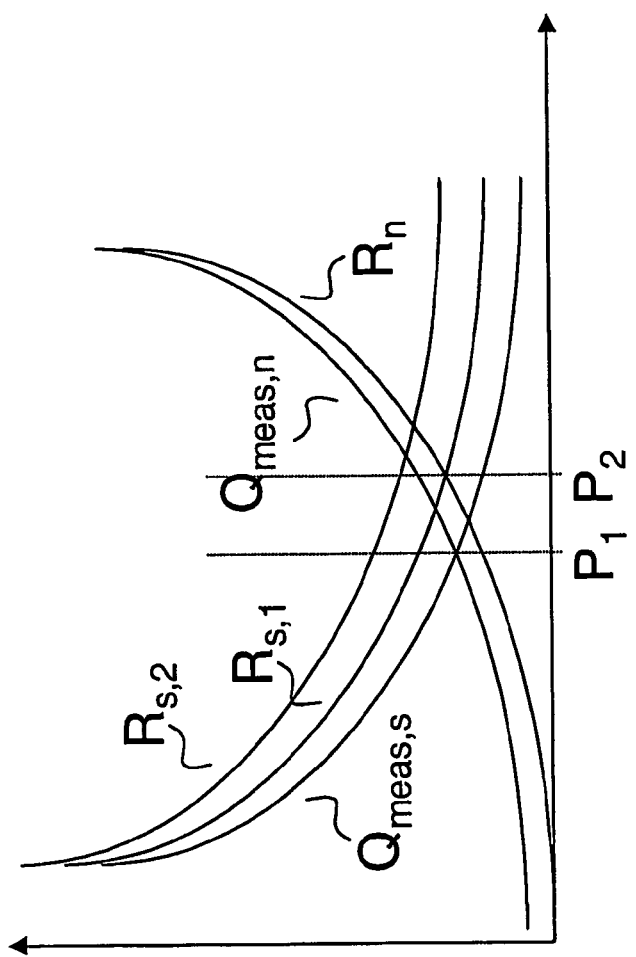
FIG. 3 illustrates in more detail cell ranking according to the invention in comparison with prior art.

The rationale of the first and second embodiments is further explained in relation to FIG. 3, illustrating in more detail cell ranking according to the invention in comparison with prior art.

A second hysteresis level, greater than a first hysteresis level, is added to the measured quality level <<$Q_{meas,s}$>> of the serving cell to achieve a second ranking level <<$R_{s,2}$>>, greater than a first ranking level <<$R_{s,1}$>>. The second hysteresis and ranking levels are used in idle mode. For the neighboring cell an offset level is subtracted from the measured quality level <<$Q_{meas,n}$>> of the neighboring cell.

In connected mode, the first hysteresis level, possibly equal to zero, is added to the measured quality level <<$Q_{meas,s}$>> of the serving cell to achieve a first ranking level <<$R_{s,1}$>>.

Figure 4:
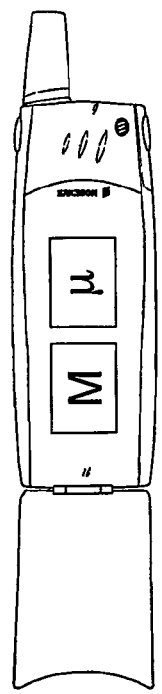
FIG. 4 shows a User Equipment according to the invention.

FIG. 4 shows a User Equipment comprising processing means <<μ>> for determining respective ranking levels from measured quality levels adjusted by hysteresis and offset levels according to the invention as described above. It also includes measuring means <<M>> for measuring at least in idle mode quality level of one or more received signals.

According to the 3GPP specification cell and URA updates are transmitted from UE to UTRAN to be confirmed by UTRAN, i.e. Quality levels and ranking are determined at UE. This invention, however, is not limited to measuring of quality level of one particular link direction. It covers ranking and measurement levels of signals transmitted in either direction or both directions. Preferably; measurements are performed in UE and Node B for downlink and uplink, respectively.

Preferably, all system elements, such as UEs in UMTS, where applicable operate according to the invention. However, the invention can also be used in systems also including some equipment, such as UEs, not operating according to the invention.

A person skilled in the art readily understands that the receiver and transmitter properties of a BS or a UE are general in nature. The use of concepts such as BS, UE or RNC within this patent application is not intended to limit the invention only to devices associated with these acronyms. It concerns all devices operating correspondingly, or being obvious to adapt thereto by a person skilled in the art, in relation to the invention. As an explicit nonexclusive example the invention relates to mobile stations without a subscriber identity module, SIM, as well as user equipment including one or more SIMs. Further, protocols and layers are referred to in close relation with UMTS and Internet terminology. However, this does not exclude applicability of the invention in other systems with other protocols and layers of similar functionality. As a nonexclusive example, the invention applies for transmission of paging messages avoiding state inconsistency locking.

The invention is not intended to be limited only to the embodiments described in detail above. Changes and modifications may be made without departing from the invention. It covers all modifications within the scope of the following claims.

The invention claimed is:

1. A method of cell selection in a cellular radio communication system, said method comprising the steps of:
   when in an access mode of a mobile station in the cellular radio communication system, utilizing a first hysteresis level for determining a first ranking level of a serving cell responsive to the mobile station being in the access mode; and
   when in an idle mode of a mobile station, utilizing a second hysteresis level for determining a second hysteresis level responsive to the mobile station being in the idle mode, the second hysteresis level being higher than the first hysteresis level, thereby providing cell selection based upon the mode of the mobile station.

2. The method recited in claim 1, wherein the first hysteresis level and the first ranking level of the serving cell are used for cell selection or reselection at user equipment system access, and wherein the second hysteresis level of the serving cell and second ranking level are used for cell selection or reselection when user equipment is in idle mode.

3. The method recited in claim 1, wherein the first hysteresis level equals zero.

4. The method recited in claim 1, further comprising:
   using, at access, a first offset level for determining a second ranking level of each of one or more cells being candidates for selection; and,
   using, in idle mode, a second offset level for determining a second ranking level of the one or more cell selection candidates.

5. The method recited in claim 4, wherein the first offset level and the first ranking level of one or more cells being candidates for selection are used for cell selection or reselection at user equipment system access, and the second offset level and second ranking level of the one or more cells being candidates for selection are used for cell selection or reselection when user equipment is in idle mode.

6. The method recited in claim 4, wherein the first offset level equals zero.

7. The method recited in claim 1, wherein the first hysteresis or offset level comprises a first time dependent component, and the second corresponding level comprises a less restrictive second time dependent component.

8. The method recited in claim 1, wherein the first hysteresis or offset level comprises a first time dependent component and the second level does not comprise a time dependent component.

9. The method recited in claim 1, further comprising measuring a quality level of one or more received signals in idle mode, wherein respective quality levels of at least one of the serving cell and one or more cells being candidates for cell selection at access are identical to those of a most recent measurement in idle mode.

10. The method recited in claim 1, further comprising routing of access messages at User Equipment system access in cells where the User Equipment has not registered.

11. The method recited in claim 1, wherein access includes access within areas where the system is capable of resolving access attempts from different User Equipments, such as location areas, routing areas or MSC areas.

12. The method recited in claim 1, wherein the cellular radio communications system is a Universal Mobile Telecommunications System or a WCDMA system.

13. A radio communications system comprising means for carrying out the method recited in claim 1.

14. An apparatus for providing cell selection in a cellular radio communication system, said apparatus comprising:
   processing means adapted to:
      when in an access mode of a mobile station in the cellular radio communication system, utilize a first hysteresis level for determining a first ranking level of a serving cell responsive to the mobile station being in the access mode; and
      when in idle mode of a mobile station, utilize a second hysteresis level for determining a second hysteresis level responsive to the mobile station being in the idle mode, the second hysteresis level being higher than the first hysteresis level, thereby providing cell selection based upon the mode of the mobile station.

15. The apparatus recited in claim 14, wherein the first hysteresis level and first ranking level of the serving cell are levels for system access, and the second hysteresis level and ranking level of the serving cell are levels for idle mode.

16. The apparatus recited in claim 14, wherein the first hysteresis level equals zero.

17. The apparatus recited in claim 14, wherein said processing means is further adapted to:
   determine a first ranking level of each of one or more cells, being candidates for selection, from a first offset level; and,
   determine a second ranking level of each of the one or more cells, being candidates for selection, from a second offset level.

18. The apparatus recited in claim 17, wherein the first offset level and the first ranking level of one or more cells being candidates for selection are levels for system access and the second offset level and second ranking level of the one or more cells being candidates for selection are levels for idle mode.

19. The apparatus recited in claim 17, wherein the first offset level equals zero.

20. The apparatus recited in claim 14, wherein the first hysteresis or offset level comprises a first time dependent component and the second corresponding level comprises a less restrictive second time dependent component.

21. The apparatus recited in claim 14, wherein the first hysteresis or offset level comprises a first time dependent component and the second level does not comprise a time dependent component.

22. The apparatus recited in claim 14, further comprising:
   measuring means for measuring a quality level of one or more received signals in idle mode, wherein respective quality levels of at least one of the serving cell and one or more cells being candidates for cell selection at access are identical to those of a most recent measurement in idle mode.

23. The apparatus recited in claim 14, wherein the cellular radio communications system is a Universal Mobile Telecommunications System or a WCDMA system.

24. The apparatus recited in claim 14, wherein the apparatus is a mobile terminal.

25. The apparatus recited in claim 24, wherein said processing means is further adapted to route access messages in cells where the User Equipment has not registered.

26. The apparatus recited in claim 24, wherein access includes access within areas where the system is capable of resolving access attempts from different User Equipments, such as location areas, routing areas or MSC areas.

27. The apparatus recited in claim 14, wherein the apparatus is selected from the group consisting of a radio base station, Node B and a radio network controller.

28. The radio communications system comprising the apparatus recited in claim 14.

* * * * *